Figure 1:
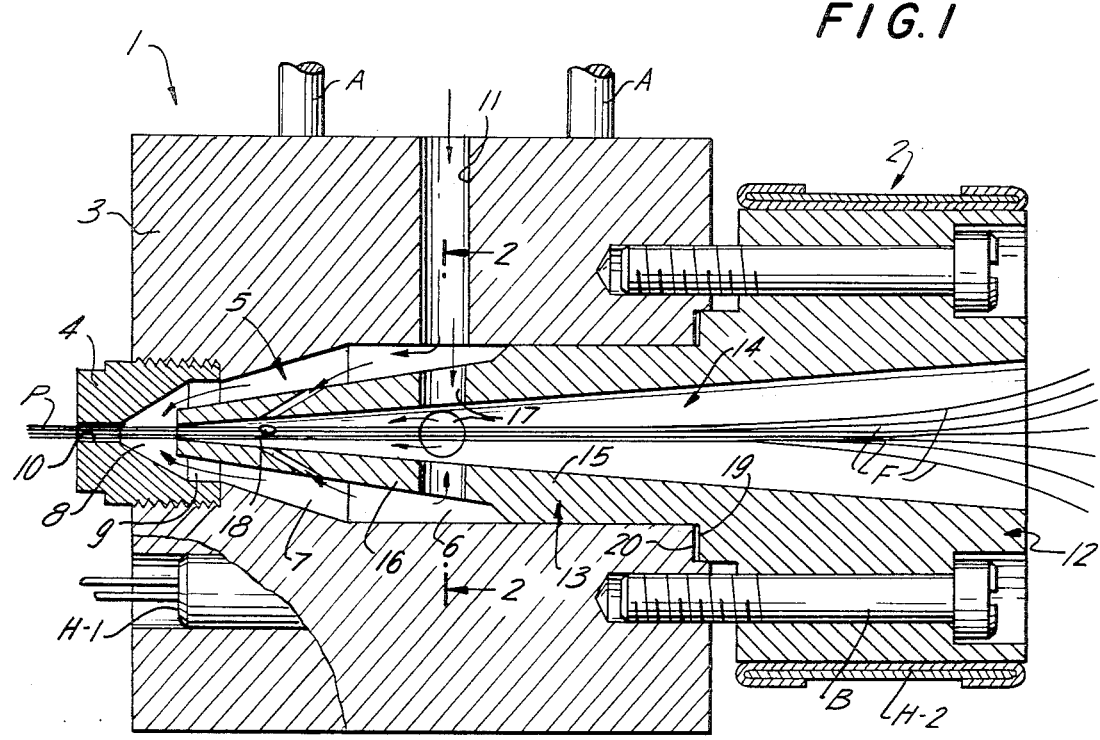

United States Patent
Stuart

[15] 3,694,131
[45] Sept. 26, 1972

[54] DIE FOR IMPREGNATING AND COATING FILAMENTARY MATERIAL

[72] Inventor: James L. Stuart, Evansville, Ind.
[73] Assignee: Dart Industries Inc., Los Angeles, Calif.
[22] Filed: March 25, 1971
[21] Appl. No.: 127,909

[52] U.S. Cl. .................. 425/461, 425/113, 425/379, 264/271
[51] Int. Cl. ............................................. B28b 23/00
[58] Field of Search....425/71, 90, 97, 113, 114, 122, 425/131, 133, 192, 378, 379, 380, 381, 461, 462, 463, 464; 264/271, 272, 279

[56] References Cited

UNITED STATES PATENTS

| | | | |
|---|---|---|---|
| 2,962,759 | 12/1960 | Maccaferri | 425/378 X |
| 3,497,582 | 2/1970 | Pettersson | 425/192 X |

Primary Examiner—J. Spencer Overholser
Assistant Examiner—Lucius R. Frye
Attorney—Fred S. Valles and Richard A. Dannells, Jr.

[57] ABSTRACT

A die is described comprising a die body having passage means extending therethrough and a resin inlet communicating therewith; said passage means including first and second coaxial frusto-conical passage sections tapering in the same direction, a cylindrical passage section coaxial with the frusto-conical passage sections and disposed between them connecting the smallest diameter end of the first frusto-conical passage section with the largest diameter end of the second frusto-conical passage section, and a cylindrical sizing passage section communicating with the smallest diameter end of the second frusto-conical passage section and forming the outlet of said passage means from said die body; a pilot member having a flange portion, a nose portion and a guide passage means extending therethrough having an inlet end in the flange portion and a tapered outlet end in the nose portion; said pilot member being mounted on said die body in a manner whereby said nose portion of the pilot member extends into the passage means of the die body forming an annular chamber extending at least from the resin inlet of the die body to the interior region of the second frusto-conical passage section spaced from the cylindrical sizing passage section; said nose portion including a frusto-conical section tapering toward and terminating at the outlet end of said guide passage means and having a plurality of orifices therein connecting said annular chamber with said guide passage means; and a first heating means for said die body and a second heating means for said pilot member.

9 Claims, 2 Drawing Figures

PATENTED SEP 26 1972　　　　　　　　　　　　　　　3,694,131

INVENTOR.
JAMES L. STUART
BY
ATTORNEY

DIE FOR IMPREGNATING AND COATING FILAMENTARY MATERIAL

This invention relates to an improved die for impregnating and coating filamentary material with a flowable polymeric resin.

It is conventional practice to produce resin impregnated and coated filamentary material by passing the filamentary material through a die while simultaneously extruding a resin into and around the filamentary material. A variety of problems have been associated with the prior art dies used for this purpose. For example, certain areas within the dies may tend to collect stagnant masses of resin which then proceed to degrade after prolonged periods of stagnation due to the elevated temperatures. Additionally, the impregnation and coating of the filamentary material oftentimes is non-uniform and contains voids. Moreover, when different colored resins are employed difficulties are encountered in thoroughly cleaning the die between runs.

These and other problems in the prior art are substantially overcome with the present invention wherein there is provided a die to be mounted directly on an extruder or to an adapter of an extruder which comprises a die body having passage means extending therethrough with a resin inlet communicating therewith, the passage means including first and second coaxial frusto-conical passage sections tapering in the same direction, a cylindrical passage section coaxial with the frusto-conical passage sections and disposed between them connecting the smallest diameter end of the first frusto-conical passage section with the largest diameter end of the second frusto-conical passage section, and a cylindrical sizing passage section communicating with the smallest diameter end of the second frusto-conical passage section and forming the outlet of the passage means from the die body; a pilot member having a flange portion, a nose portion and a guide passage means extending therethrough having an inlet end in the flange portion and an outlet end in the nose portion, the pilot member being mounted on the die body in a manner whereby the nose portion of the pilot member extends into the passage means of the die body forming an annular chamber extending at least from the resin inlet of the die body to the interior region of the second frusto-conical passage section spaced from the cylindrical sizing passage section, the nose portion including a frusto-conical section tapering toward and terminating at the outlet end of the guide passage means and having a plurality of orifices therein connecting the annular chamber with the guide passage means; and a first heating means for the die body and a second heating means for the pilot member. In operation, the filamentary material to be impregnated and coated with a polymeric resin is fed to the die through the guide passage means of the pilot member while the polymeric resin is fed to the die through the resin inlet of the die body. The polymeric resin fills the annular chamber and flows through the orifices in the nose portion of the pilot member into the guide passage means whereupon it thoroughly impregnates the filamentary material passing therethrough. As the impregnated filamentary material passes from the outlet end of the guide passage means to the cylindrical sizing passage section the polymeric resin flowing through the annular chamber fills the second frusto-conical passage section and surrounds and coats the impregnated filamentary material. The thus coated and impregnated filamentary material is then passed through the cylindrical sizing passage section for final sizing and the resin is then solidified.

Figure 2:
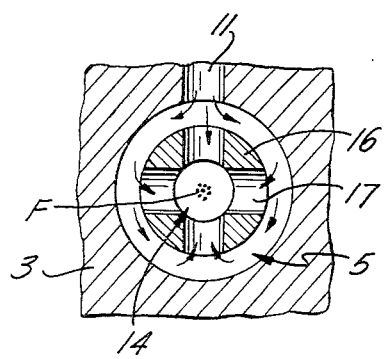

With the above general description in mind the invention will be better understood from the following discussion of the invention in connection with the drawing wherein FIG. 1 illustrates an embodiment of a die in accordance with the invention, the view being a partial sectional elevation taken substantially through the center. FIG. 2 is a partial cross-sectional view taken along line 2—2 in FIG. 1.

With reference to FIG. 1, there is shown a die body generally indicated by reference numeral 1 having assembled thereto a pilot member 2 all of which comprises the die of this invention. The die body 1 is formed by head member 3 and plug member 4 threadedly mounted on the head member. Passage means generally indicated at 5 extend through both the head member and plug member and include a sealing passage section 6, a first frusto-conical passage section 7, a second frusto-conical passage section 8, a cylindrical passage section 9 coaxial with and connecting frusto-conical passage sections 7 and 8, and a cylindrical sizing passage section 10 leading from the small diameter end of the second frusto-conical passage section 8 to the exterior of die body 1. While the terms "frusto-conical" and "cylindrical" imply a circular cross-sectional configuration, and FIG. 2 so illustrates the embodiment, it is pointed out that for purposes of this invention these terms are intended to include other configurations of a continuous curved nature, that is, configurations without recesses or sharp corners such as ovular and the like.

Head member 3 is provided with a polymeric resin inlet 11 which communicates with passage means 5. When the head member is secured directly to an extruder or extruder adapter by any conventional means such as bolts A the polymeric resin is fed through the inlet 11 into the passage means as indicated by the arrows in FIGS. 1 and 2.

While plug member 4 is illustrated as being threadedly secured to the head member it should be understood that both the plug member and the head member may be formed as an integral member. Moreover, while the removable plug member, as illustrated, encompasses the cylindrical passage section, the second frusto-conical passage section and the cylindrical sizing passage section, such plug member may be made larger to encompass all or a portion of the first frusto-conical passage section or may be made smaller to encompass a more limited portion of passage means 5.

The die body 1 is provided with a heating means H-1 which may be any conventional heating means such as electrical resistance heating elements or jacketing for circulation of some heating medium. The heating means must be capable of heating and maintaining the die body at a temperature sufficient to prevent the polymeric resin from solidifying in the inlet 11 or passage means 5.

The pilot member 2 comprises a flange portion 12 and a nose portion 13 with a guide passage means 14 extending therethrough forming an inlet in the flange portion and a tapered outlet in the nose portion and through which the filamentary material is passed in being impregnated and coated with the polymeric resin.

The nose portion of the pilot member comprises a sealing base section 15 and a forward extending frusto-conical section 16 tapering toward and terminating at the outlet end of the guide passage means 14. The sealing base section 15 is of a cross-sectional configuration corresponding to the cross-sectional configuration of the sealing passage section 6 of the die body 1 whereby the nose portion of the pilot member may be inserted into the rear of he passage means 5 with the sealing base section 15 in sealing engagement with the walls of the sealing passage section 6 and the frusto-conical section 16 extending into the forward portion of the passage means to form an annular chamber between the walls of the passage means 5 and the frusto-conical section 16 of the pilot member. The frusto-conical section 16 is of sufficient length that the annular chamber extends at least from the resin inlet 11 to the interior region of the second frusto-conical passage section 8.

While the drawing illustrates the annular chamber as becoming smaller in the region of the first frusto-conical passage section 7 due to the convergence of the defining walls this feature need not be present and the annular chamber may be of constant size through this region, that is, the taper of the frusto-conical passage section 7 and the taper of the frusto-conical section 16 may be inclined with the same angularity. It is, however, essential that the size of the annular chamber be increased just prior to termination of the chamber so that the resin flowing through the chamber under stress due to extruder pressure is permitted to relax and expand. Unless this relaxation and expansion is achieved the resin will not properly coat and adhere to the impregnated filamentary material emerging from the pilot member. For this purpose the cylindrical passage section 9 is provided through which the tapered frusto-conical section 16 of the nose portion extends. Thus, as shown in the drawing, the annular chamber through this region increases in cross-sectional area due to the constant diameter of the outer wall and decreasing diameter of the inner wall.

The frusto-conical section 16 of the nose portion 13 is provided with a plurality of orifices 17 and 18. These orifices permit resin to flow from the annular chamber to the guide passage means 14 of the nose portion to impregnate the filamentary material passing therethrough. The number and/or size of the orifices must be such as to provide sufficient resin to the guide passage means 14 to satisfactorily impregnate the filamentary material and provide a substantially void-free composite to emerge from the outlet end of the pilot member 2. On the other hand, the orifices must not be too numerous or large as to create extensive back-flow of the resin toward the outlet end of the guide passage means 14. To some degree the speed of the extruder, the physical characteristics of the resin and the speed at which the filamentary material is pulled through the die will affect the optimum number and size of the orifices for any particular operation and all factors must be balanced to achieve the optimum results.

A particularly suitable arrangement of the orifices is illustrated in the drawing. A series of radially extending orifices 17 perpendicular to the axis of the pilot member and located at or near the region corresponding to the resin inlet 11 provides resin to the filamentary material at an early point in the operation without creating potential regions where resin may stagnate and degrade. While four such radial orifices are shown any convenient number may be used with or without equal spacing. The manner in which the orifices 17 are specifically arranged in the embodiment of FIG. 1 and the manner in which the resin flows into and around the annular chamber from inlet 11 and ultimately through all orifices 17 into guide passage means 14 is specifically illustrated in FIG. 2.

Another series of four orifices 18 are located further forward on the frusto-conical section 16 of the nose portion. These orifices 18 are radially and angularly disposed in the direction of flow of the filamentary material and extend from the outer surface of the frusto-conical section 16 forwardly to the guide passage means 14. These orifices provide for the streamlined flow of a second quantity of resin to the filamentary material in the guide passage means to insure complete and substantial impregnation of the material.

It will be understood that while the above described arrangement of orifices has been found exceedingly effective this invention contemplates that other arrangements may be used which may be equally suitable depending on the particular nature of an operation.

While impregnation of the filamentary material is initiated in the regions where resin is introduced to the guide passage 14 the final impregnation and compacting of the resin-filamentary material composite is accomplished at the outlet region of the guide passage due to the taper of the guide passage. While the guide passage 14 has been illustrated as being of frusto-conical configuration it should be understood that other streamlined configurations may also be used. The purpose of such streamlined configuration is to preclude the formation of stagnant regions of resin from forming since during normal operation of the die some resin entering the guide passage through orifices 17 will tend to back-up in the guide passage due to extruder pressure. The quantity of resin back-up will vary as the pressure fluctuates and to the extent of such back-up the guide passage should be of streamlined configuration. It is also pointed out that the glass fibers passing through the guide passage tend to wipe the walls of the streamlined passage and thus tend to aid in preventing the formation of stagnant regions of resin. The remaining portion of the guide passage means rearward beyond the area of resin back-up may be of any configuration suitable for receiving the filamentary material and guiding it in its forward movement through the die.

The flange portion 12 of the pilot member is preferably provided with shoulders 19 which engage seats 20 of the die body and serve to limit the extent to which the nose portion of the pilot member may be inserted in the passage means 5 of the die body. Limited adjustment of the pilot member relative to the die body may be accomplished by merely inserting shims between the shoulders 19 and the seats 20. The flange portion is also provided with means for securing the pilot member to the die body such as bolts B.

It has also been found desirable to provide the pilot member 2 with a heating means separate from the heating means of the die body. Such separate heating permits better temperature control on the nose portion 13 of the pilot member and permits operation of the nose portion at a higher temperature than the die body which is desirable with certain resins. Any suitable heating means will suffice but, as illustrated, a conventional electrical resistance heating band H-2 has been found convenient.

In operation, the die is attached to an extruder, directly or through some conventional type of adapter, by way of bolts A. With the heating means H-1 and H-2 operating as desired, filamentary material F, such as glass fiber rovings, is fed through the guide passage means 14 of the pilot member and out of the die through the cylindrical sizing passage 10 of the die body. Polymeric resin, either thermoplastic or thermosetting, is fed to the die body into inlet 11. The resin fills the annular chamber and passes through the orifices 17 and 18 of the pilot member to impregnate the filamentary material F. Impregnation and compaction are finalized in the tapered outlet of the guide passage means 14. The impregnated composite emerging from the guide passage means is then coated with additional resin moving through the streamlined annular chamber and into the frusto-conical passage section 8. From there the composite is pulled through the cylindrical sizing passage 10 and cooled to result in the final coated and impregnated produce P. It is important to successful coating that the resin be relieved of stress and permitted to relax and expand slightly in going from passage section 7 to the cylindrical passage section 9 and prior to entering section 8. If such does not take place the resin coating may tend to crack and peel from the strand-type product.

The die of this invention is particularly suitable for the manufacture of glass fiber reinforced resin compositions for use in molding and extrusion operations. Such compositions are made by merely severing the product emerging from the die of this invention into small segments sometimes referred to as granules.

Thus having described the invention in detail it will be understood that certain variations and modifications may be made without departing from the spirit and scope of the invention as described herein and in the appended claims.

I claim:

1. A die comprising
  a die body having passage means extending therethrough and a resin inlet communicating therewith; said passage means including first and second coaxial frusto-conical passage sections tapering in the same direction, a cylindrical passage section coaxial with the frusto-conical passage sections and disposed between them connecting the smallest diameter end of the first frusto-conical passage section with the largest diameter end of the second frusto-conical passage section, and a cylindrical sizing passage section communicating with the smallest diameter end of the second frusto-conical passage section and forming the outlet of said passage means from said die body;
  a pilot member having a flange portion, a nose portion and a guide passage means extending therethrough having an inlet end in the flange portion and a tapered outlet end in the nose portion; said pilot member being mounted on said die body in a manner whereby said nose portion of the pilot member extends into the passage means of the die body forming an annular chamber extending at least from the resin inlet of the die body to the interior region of the second frusto-conical passage section spaced from the cylindrical sizing passage section; said nose portion including a frusto-conical section tapering toward and terminating at the outlet end of said guide passage means and having a plurality of orifices therein connecting said annular chamber with said guide passage means; and
  a first heating means for said die body and a second heating means for said pilot member.

2. A die according to claim 1 wherein the die body includes a head member and a plug member threadedly mounted thereon and the passage means extends through both the head member and the plug member.

3. A die according to claim 2 wherein that portion of the passage means extending through the plug member includes the cylindrical sizing passage, the second frusto-conical passage section and the cylindrical passage section.

4. A die according to claim 1 having means for mounting the die to an extruder or extruder adapter whereby the resin inlet of the die body may receive resin.

5. A die according to claim 1 wherein the nose portion of the pilot member has a base section adjacent the flange portion which is in sealing engagement with the passage means of the die body.

6. A die according to claim 1 wherein the flange portion of the pilot member is provided with shoulder means for limiting the extent to which the nose portion may extend into the passage means of the die body.

7. A die according to claim 1 wherein the orifices of the nose portion of the pilot member are arranged in two groups, one group extending radially from the annular chamber to the guide passage means and perpendicular to the axis thereof, the other group extending radially and angularly from the annular chamber forward to the guide passage means.

8. A die according to claim 1 wherein the second heating means is capable of heating the pilot member to a higher temperature than the first heating means is capable of heating the die body.

9. A die according to claim 1 wherein the first heating means is an electrical resistance heater contained within the die body and the second heating means is an electrical resistance heater band mounted on the flange portion of the pilot member.

* * * * *